United States Patent
Lagasse et al.

(10) Patent No.: US 8,175,898 B1
(45) Date of Patent: *May 8, 2012

(54) MODULAR MULTI-COVERAGE INSURANCE PRODUCTS

(75) Inventors: Eileen Lagasse, Windsor, CT (US); Mark Faupel, Columbia, CT (US); Douglas Colosky, Hamden, CT (US)

(73) Assignee: The Travelers Companies, Inc., St. Paul, MN (US)

( * ) Notice: Subject to any disclaimer, the term of this patent is extended or adjusted under 35 U.S.C. 154(b) by 551 days.

This patent is subject to a terminal disclaimer.

(21) Appl. No.: 12/119,301

(22) Filed: May 12, 2008

Related U.S. Application Data

(63) Continuation of application No. 11/234,859, filed on Sep. 22, 2005, now Pat. No. 7,451,097.

(51) Int. Cl.
*G06Q 40/00* (2012.01)

(52) U.S. Cl. .......................................................... 705/4

(58) Field of Classification Search ........................ None
See application file for complete search history.

(56) References Cited

U.S. PATENT DOCUMENTS

| | | | |
|---|---|---|---|
| 4,831,526 A | 5/1989 | Luchs et al. | |
| 5,950,169 A * | 9/1999 | Borghesi et al. | 705/4 |
| 6,411,936 B1 * | 6/2002 | Sanders | 705/7.32 |
| 6,684,189 B1 | 1/2004 | Ryan et al. | |
| 7,451,097 B1 * | 11/2008 | Faupel et al. | 705/4 |
| 2002/0091550 A1 | 7/2002 | White et al. | |
| 2003/0083908 A1 | 5/2003 | Steinmann | |
| 2003/0233260 A1 | 12/2003 | Snell et al. | |
| 2004/0128147 A1 | 7/2004 | Vallinayagam et al. | |
| 2004/0148201 A1 | 7/2004 | Smith et al. | |
| 2004/0181435 A9 | 9/2004 | Snell et al. | |

OTHER PUBLICATIONS

Pinkans, Michael S., "Can Group and blended Contacts Help Spark More LTC Sales?," National Underwriter, Life & Health, 109(3):17 (Jan. 24, 2005).
"The new weather-beater," Reactions, pp. 34-37 (July 1, 2003).
"Arch Insurance Group now Offers Environmental Contractors & Consultants One Integrated Insurance Policy for their Environmental Risk Exposures," Business Wire, p. 5712 (May 17, 2004).
Zolkos, Rodd "Program Tackles Operational Risk: Fmr Corp. Crafts Blended High-Limit Coverage," Business Insurance, p. 55 (Nov. 8, 1999).
Friedman, Mark, "State Insurance Regulators Oppose Federal Oversight if Industry," Arkansas Business, 20(48): 1 (Dec. 1, 2003).
"NAS Insurance Services Introduces business practices liability package policy," Annotated Title-NAS Insurance Services marketing Business practices liability policy for privately held firms, Rough Notes, 141(10):70 (Oct. 1998).
"Chubb offers program for asset managers," Annoted Title -Chubb introduced the Wealth managers Insurance program, which combines general liability, property, and professional liability insurance, Rough Notes, 141(3):710 (Mar. 1998).
"CNA enhances E-pack Coverage for Private Companies," Business Wire, (Mar. 29, 2005). McCune, Jenny, "Save money, time with consolidated insurance coverage," Bankrate.com, Http://www.bankrate.com/brm/news/financial_literacy2004/merge-policies1.asp.
Laux, Christian, "Multiline Insurance: Bundling Risks to Reduce Moral Hazard," J.W. Goethe-University Frankfurt.
Harvey R. Rubin, Dictionary of Insurance Terms, Barron's Educational Series, 4th edition, pp. 66, 94, 95, 97, 321.
Virginia State Corporation Commission, Bureau of Insurance, located at <Http://web.archive.org/web/20050308155854/www.scc.virginia.gov/division/boi/index.htm>.
Missouri Revised Statues § 379.010 and 379.321, Insurance Other Than Life, Aug. 28, 2007.

* cited by examiner

*Primary Examiner* — Russell S Glass
(74) *Attorney, Agent, or Firm* — Stroock & Stroock & Lavan LLP

(57) ABSTRACT

The invention relates to methods and systems for creating and utilizing a modular multi-coverage insurance product. The modular multi-coverage insurance product includes a set of modular state-pre-approved insurance coverages corresponding to a plurality of insurable liabilities.

31 Claims, 15 Drawing Sheets

| Quote Summary | | | |
|---|---|---|---|
| Quote Selection | ☐ Quote 1  ☐ Quote 3 | | |
| | ☐ Quote 2  ☐ Quote n | | |

Policy

| Policy | Q1 | Q2 | Q3 |
|---|---|---|---|
| Annual Premi | $6,738 | | |
| Shared Limit | $1,000,000 | | |
| Defense Cap | $1,000,000 | | |
| Commission | 12.50 | | |
| Expense | | | |

Endorsements

| Endorsement | Q1 | Q2 | Q3 |
|---|---|---|---|
| PE-004 | Included | Included | |
| DEC | Included | Included | |
| Policy | Included | Included | |
| EPL | Included | Included | |
| EPL-1004 E | Included | N/A | |

Coverage

| Coverage | Q1 | Q2 | Q3 |
|---|---|---|---|
| EPL | | | |
| Limit | $500,000 | | |
| Retention | $5,000 | | |
| IRPM | | | |
| Premium | $2,176 | | |

Approval | Outcome | Quote Letter | Bill & Issue

MODULAR MULTI-COVERAGE INSURANCE PRODUCTS

This application is a Continuation of U.S. application Ser. No. 11/234,859 filed Sep. 22, 2005, titled "MODULAR MULTI-COVERAGE INSURANCE PRODUCTS", which is herein incorporated by reference in its entirety.

FIELD OF THE INVENTION

The invention relates, in general, to the field of insurance policy generation, and more particularly to systems and methods for generating insurance policies using a modular multi-coverage insurance product.

BACKGROUND OF THE INVENTION

Typically, to offer a new or revised insurance product, an insurance company faces an expensive, risky ordeal. The insurance company must attempt to obtain regulatory approval of the insurance product in each state and territory in which the insurance company wishes to offer the policy. Each state and territory independently reviews such new or revised products, resulting in some states approving one version of an insurance product, and other states approving a second version. In addition, in reviewing changes to old insurance products, states review policies in their entirety, not just the changes to the policy. Thus, it is often safer for an insurance company to create a new product than to revise an old product, and thereby risk the old product being rejected.

As a result, insurance companies typically end up offering a variety of insurance products, many of which provide similar coverages. However, an available coverage for a particular liability under one insurance product often differs from the coverage for the same liability provided by the same company under other insurance products. The variation of coverages results in increased costs of training employees to understand the subtle differences between the various similar coverages. The coverage variation also results in increased marketing costs.

SUMMARY OF THE INVENTION

The invention is generally directed to systems, methods, and software for creating, revising, and utilizing modular multi-coverage insurance products ("MMCIPs") to mitigate these deficiencies in the prior art. By working with modular coverage-based insurance products, an insurance company reduces the cost and risk of obtaining approval for adding additional coverages to an insurance product or revising already approved coverages. States only need to approve the particular coverage being added or revised, thereby avoiding state review of previously approved coverages. In addition, the insurance company can utilize the modular coverages across multiple insurance products allowing for reduced training and marketing costs.

In one aspect, the invention relates to a method for generating an MMCIP. The method includes providing a set of modular state-pre-approved coverages corresponding to a plurality of insurable liabilities and receiving a selection of a subset of the coverages from a customer. The method further includes combining the selected subset of coverages with a policy framework to generate an insurance policy. The method may be carried out, for example over the Internet or other computer network.

The policy framework includes, in one embodiment, terms and conditions applicable to each of the selected coverages. The policy framework may also include a rating plan that provides discounts based on a number of the state-pre-approved coverages that are selected to be included in a policy. The policy framework is approved by a state independent of any of the modular coverages included in the set of modular state-pre-approved coverages.

In one embodiment, the set of state-pre-approved coverages includes one or more of the following coverages: a private company directors and officers liability coverage, a non-profit organization directors and officers liability coverage, an employment practices liability coverage, a fiduciary liability coverage, a miscellaneous professional liability coverage, a crime coverage, a kidnap and ransom coverage, and an identity fraud coverage. Preferably, each coverage includes an independent rating plan for determining a corresponding premium. In one embodiment, at least one coverage can serve as a standalone insurance product.

In a further aspect, the invention relates to a data storage medium encoding instructions for a computer to perform a similar method of generating an insurance policy described above based on an MMCIP. The data storage medium, in one embodiment, is encoded with instructions for estimating an insurance policy premium based on the selected subset of modular state-pre-approved coverages. The premium estimation is based on requested liability limits for specific coverages or shared liability limits across multiple coverages. The encoded instructions may provide for receiving additional subsets of modular state-pre-approved coverages and generating estimates for insurance policies including the other subsets of coverages. In one embodiment, the data storage medium also encodes instructions for storing multiple premium estimates and displaying the estimates concurrently to a user to aid in the user selecting a set of coverages and limits.

In another aspect, the invention relates to the MMCIP itself. The MMCIP includes a set of modular state-pre-approved coverages corresponding to a plurality of insurable liabilities, a policy framework for incorporating a subset of the coverages into an insurance policy, and a set of terms and conditions which are applicable to the combination of the policy framework and the subset of coverages.

In yet another aspect, the invention relates to a method of obtaining regulatory approval for a plurality of insurance products. The method includes obtaining regulatory approval of a plurality of independent insurance coverages corresponding to a plurality of insurable liabilities. Each of the independent insurance coverages includes a separate rating plan for determining premiums for that coverage. The method also includes obtaining regulatory approval for a framework policy into which the independent coverages can be incorporated. The framework policy includes its own rating plan and a set of terms and conditions. The method then generates a number of insurance products by combining the approved framework policy with various combinations of the approved independent coverages. The resulting insurance products can be modified by revising one of the independent coverages and seeking independent approval from a regulatory body for the revision.

In an additional aspect, the invention relates to an apparatus for generating an insurance policy. The apparatus includes which includes a means for offering a user a set of modular state-pre-approved coverages corresponding to a plurality of insurable liabilities and means for accepting a selection from the user of a subset of the plurality of modular state-pre-approved coverages. The apparatus also includes a means for combining the subset of selected modular state-pre-approved coverages with a policy framework to generate the insurance policy.

In still a further aspect, the invention relates to an apparatus for generating an insurance policy which includes a memory for storing data corresponding to a set of modular state-pre-approved coverages corresponding to a plurality of insurable liabilities. The apparatus also includes an output for offering a user the set of modular state-pre-approved coverages stored in the memory and an input for accepting a selection by the insurance customer of a subset of the plurality of modular state-pre-approved coverages. The apparatus further includes a processor for combining the subset of selected modular state-pre-approved coverages with a policy framework to generate the insurance policy.

BRIEF DESCRIPTION OF THE DRAWINGS

The system and methods may be better understood from the following illustrative description with reference to the following drawings in which:

FIGS. 9-14 are computer screen shots output by a software application for generating insurance policies and quotes for such insurance policies based on the modular multi-coverage insurance product of FIG. 2, an according to an illustrative embodiment of the invention;

DETAILED DESCRIPTION

To provide an overall understanding of the invention, certain illustrative embodiments will now be described, including methods for obtaining regulatory approval of modular multi-coverage insurance products and revisions thereto, and methods and systems for generating a multi-coverage insurance policy based on modular multi-coverage insurance product. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

An issued insurance policy generally includes at least three elements, a description of the potential liability the policy protects against (referred to herein as a "coverage"), a liability limit, and a premium. Insurance companies have offered multi-coverage insurance products including a set of coverages from which a customer can select one or more to form an issued policy. For these multi-coverage insurance products, insurance companies base the premium on a general rating plan which includes premiums for various combinations of selected coverages and selected liability limits.

To obtain approval from various states to offer such an insurance product, the insurance company files the set of coverages along with the general rating plan ("the filing") with the state regulatory boards of each state in which the insurance company plans to offer the product. If the state regulatory board disapproves of any portion of the filing, the regulatory board rejects the entire filing.

Figure 1:
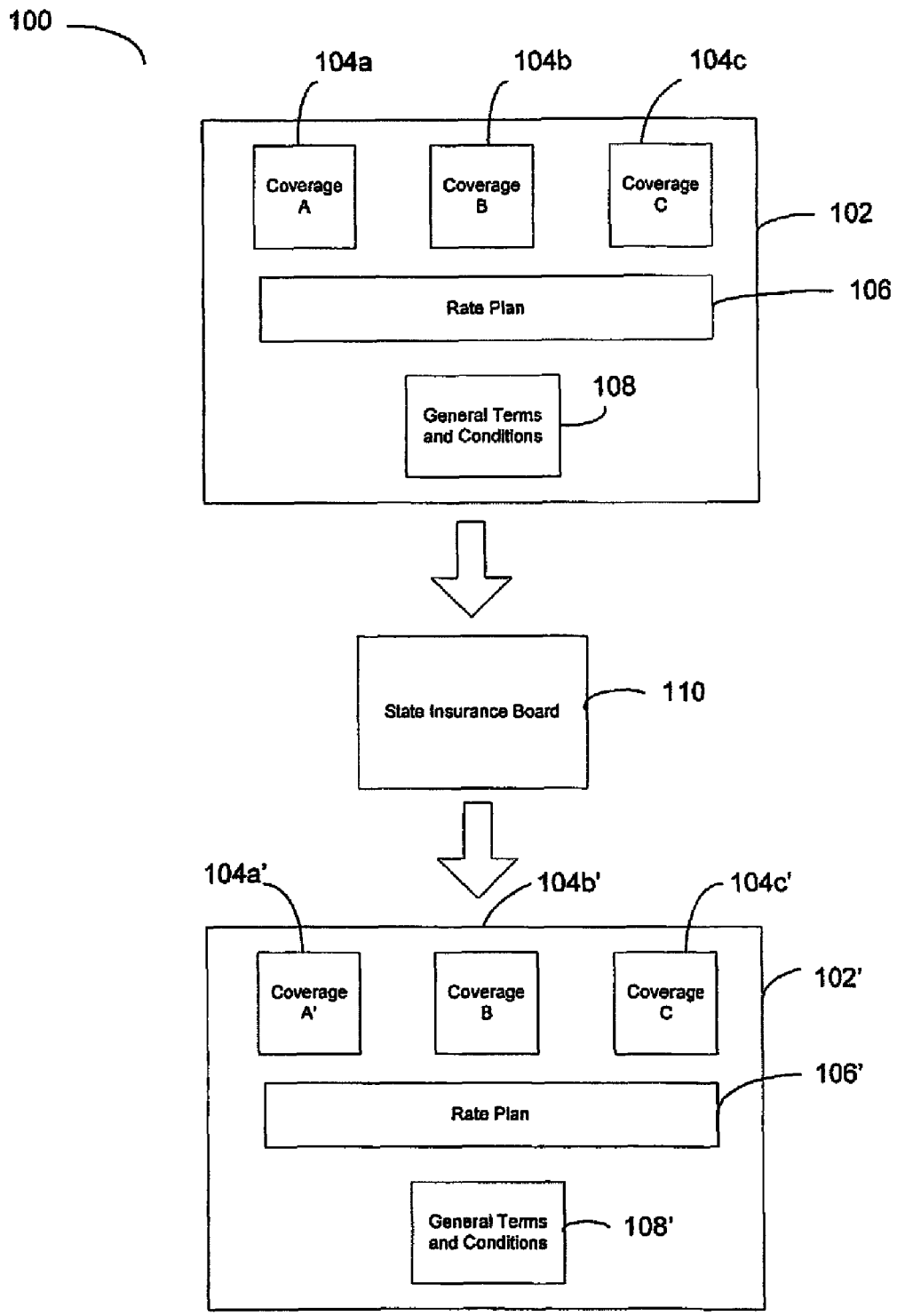
FIG. 1 is a conceptual diagram of a process for obtaining regulatory approval for changes made to a multi-coverage insurance product known in the prior art.

FIG. 1 is a conceptual diagram of a process 100 for obtaining regulatory approval for changes made to a multi-coverage insurance product 102 known in the prior art. The multi-coverage insurance product 102 includes three coverages 104a, 104b and 104c (generally "coverages 104"), from which a customer can select to build a policy. The multi-coverage insurance product 102 also includes a rating plan 106 and general terms and conditions 108 which apply to all coverages 104.

To revise a portion of the multi-coverage insurance product 102, such as coverage 104a, an insurance company must submit the entire insurance product 102 along with the revised portion, e.g. coverage 104a' to state regulatory boards 110 for review. If the regulatory boards approve the insurance product, the insurance company can offer the revised multi-coverage insurance product 102' for sale.

As with the initial approval of the multi-coverage insurance product, in reviewing a revision to any component of the multi-coverage insurance product 102, the regulatory boards review the multi-coverage insurance product 102 as a whole. Regulatory board membership and priorities frequently change as a result of changes to the political landscape. Thus, a component of a multi-coverage insurance product 102, such as coverage 104b, which was approved by a regulatory board at one point in time, might be rejected by the regulatory board years later, such as when the insurance company files for approval of coverage 104a'. The resulting uncertainty and risk arising from the wholesale review of insurance policies when seeking approval for changes to individual components reduces insurance company flexibility in responding to changing customer demands and changes to the legal and regulatory environment.

Figure 2:
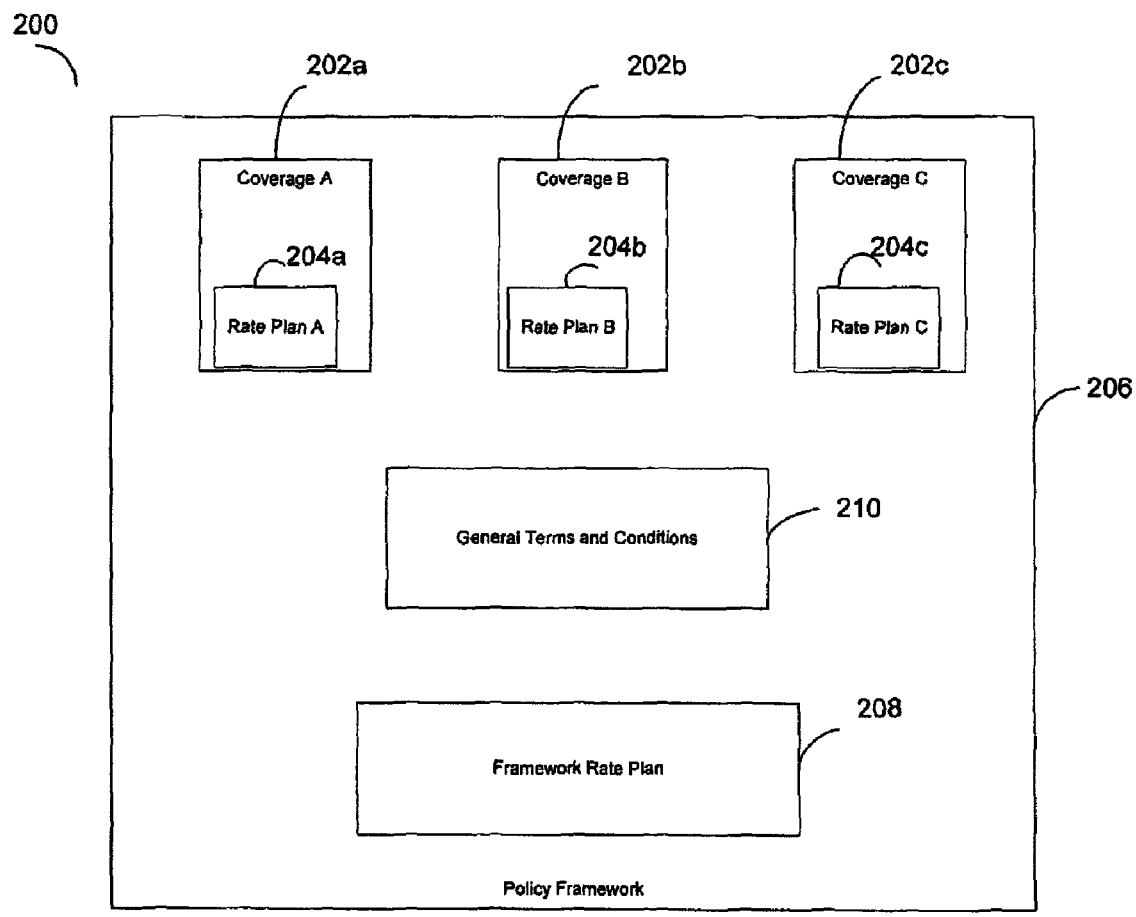
FIG. 2 is a block diagram of a modular multi-coverage insurance product according to an illustrative embodiment of the invention.

FIG. 2 is a block diagram of a modular multi-coverage insurance product 200 ("MMCIP 200"), according to an illustrative embodiment of the invention, that overcomes this shortcoming of the prior art. The MMCIP 200 includes a plurality of coverages 202a-202c (generally "coverages 202"). The MMCIP 200 only includes three coverages 202 for illustrative purposes. The MMCIP 200 can include any integer number of coverages. In contrast to the coverages 104, coverages 202 include their own corresponding rating plans 204a-204c. The coverages 202 may include, for example, and without limitation, private company directors and officers liability coverage, a non-profit organization directors and officers liability coverage, an employment practices liability coverage, a fiduciary liability coverage, a miscellaneous professional liability coverage, a crime coverage, a kidnap and ransom coverage, and an identity fraud coverage.

The coverages 202 included in the MMCIP 200 are optional. That is, customers, when purchasing an MMCIP 200 are provided with the set of coverages 202 which are available in the MMCIP 200. The customer then selects one or more of the coverages 202 to include in their particular policy.

The MMCIP 200 includes a policy framework 206 which combines the coverages 202 into a coherent insurance policy. The MMCIP 200 includes a framework rating plan 208 and general terms and conditions 210 applicable to all coverages 202 in the MMCIP 200. The framework rating plan 206 provides discounted rates depending on the number of coverages 202 selected for inclusion in an insurance policy formed based on the MMCIP 200. The framework rating plan 208 may also include premium adjustment functions for adjusting a premium to take into account liability limits shared across coverages 202 in a particular policy.

Figure 3:
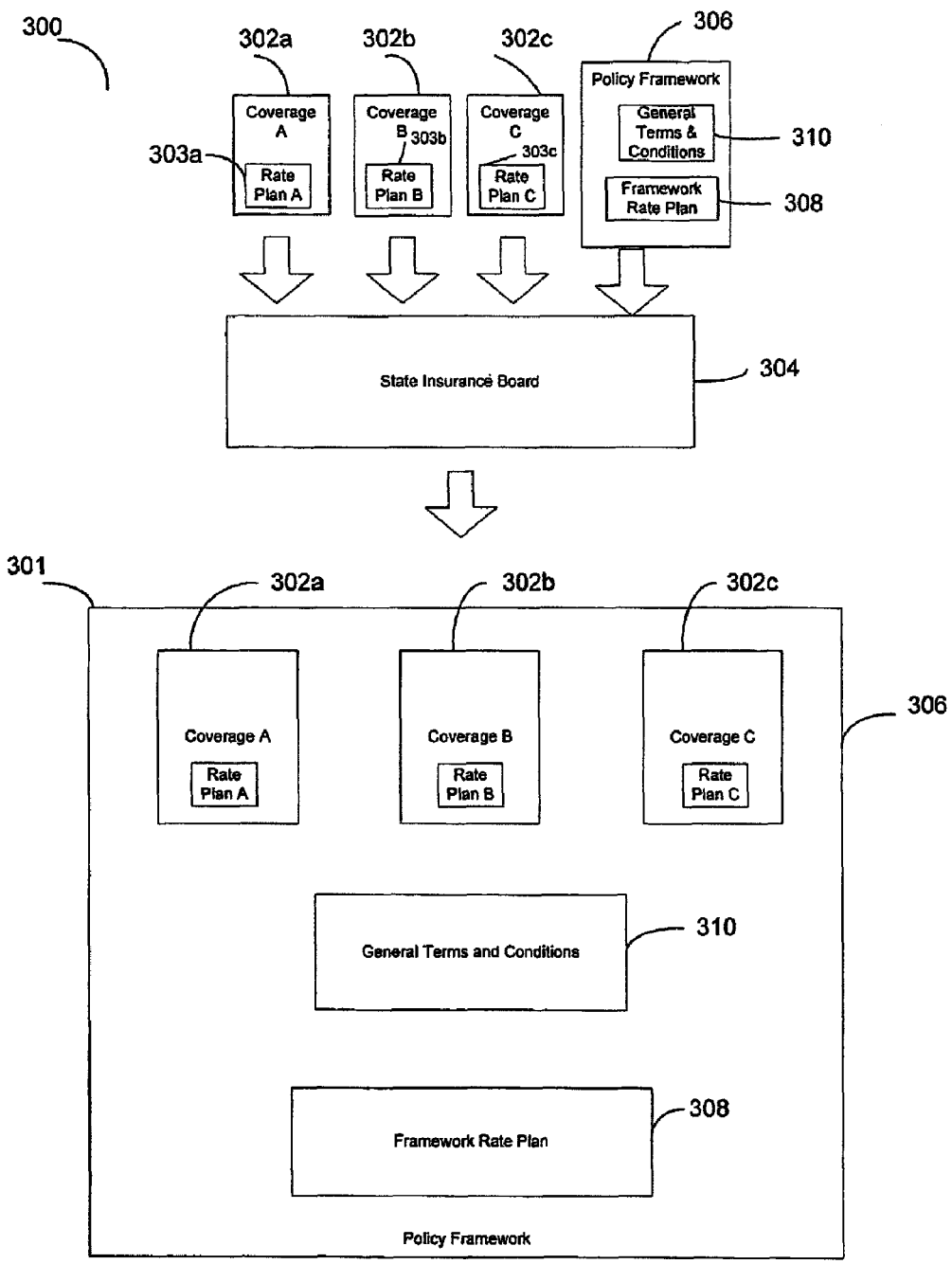
FIG. 3 is a conceptual diagram of a method for obtaining regulatory approval for the modular multi-coverage insurance product of FIG. 2, according to an illustrative embodiment of the invention.

FIG. 3 is a conceptual diagram of a method 300 for obtaining regulatory approval for a MMCIP 301, according to an illustrative embodiment of the invention. To obtain regulatory approval, an insurance company independently files a plurality of coverages 302a-302c (generally "coverages 302"), including corresponding routing plans 303a-303c with a state regulatory board 304. The insurance company may file the coverages 302 with the intent to solely offer the coverages 302 as part of the MMCIP 301, or the insurance company may also intend to offer one or more of the coverages 302 as a standalone insurance product. The insurance company also files the policy framework 306 along with the framework rating plan 308 and the general terms and conditions 310 with the state regulatory board 304. Assuming each of the coverages 302 and the policy framework 306 are approved, the insurance company can then offer the MMCIP 301 with any of the approved coverages 302. If the state regulatory board 304 rejects any one of the coverages 302 or the policy framework 306, that rejection has no bearing on the acceptance or rejection of the remaining components of the MMCIP 301. Thus, if the regulatory board approves the policy framework 306 and coverages 302a and 302b, but rejects coverages 302c, the insurance company can offer the MMCIP 301 with the option to include coverages 302a and 302b.

Figure 4:
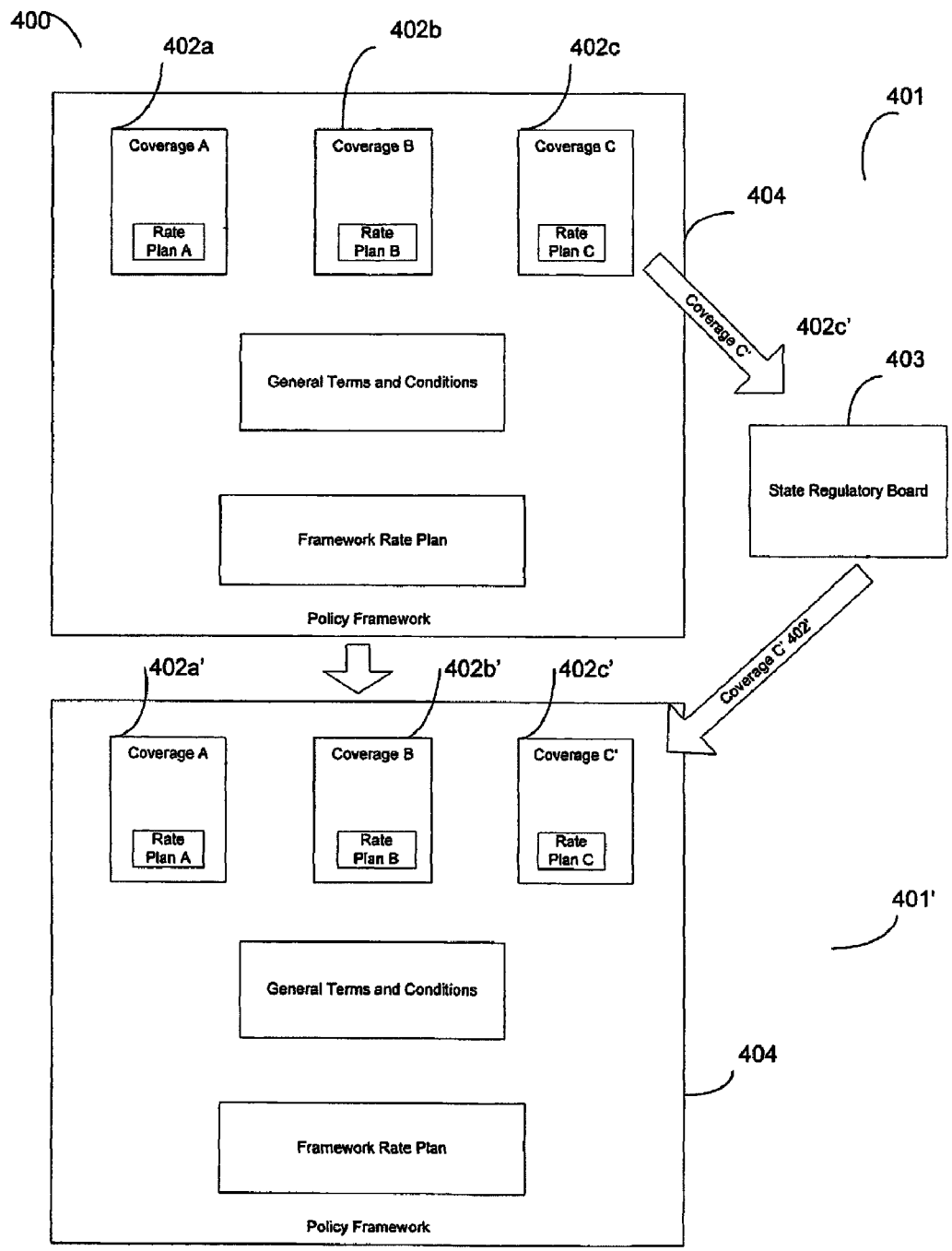
FIG. 4 is a conceptual diagram of a method for obtaining regulatory approval for a modification to a coverage offered as part of the modular multi-coverage insurance product of FIG. 2, according to an illustrative embodiment of the invention.

FIG. 4 is a conceptual diagram of a method 400 for obtaining regulatory approval for a revision to a MMCIP 401. As the coverages 402a-402c and the policy framework 404 of the MMCIP 401 are independently approved, they can also be independently revised. For example, if the insurance company offering MMCIP 401 wants to revise coverage 402c, the insurance company files a revised coverage, Coverage C' 402c' with the state regulatory board 403. The insurance agency does not need to refile the remaining components of the MMCIP 401. If the revised coverage 402c' is accepted, the insurance company can offer the newly approved coverage 402c' in MMCIP 401'. Similarly, the insurance company could file for approval of a revised policy framework 404 without needing to refile any of the coverages 402 offered in the MMCIP 401.

Figure 5:
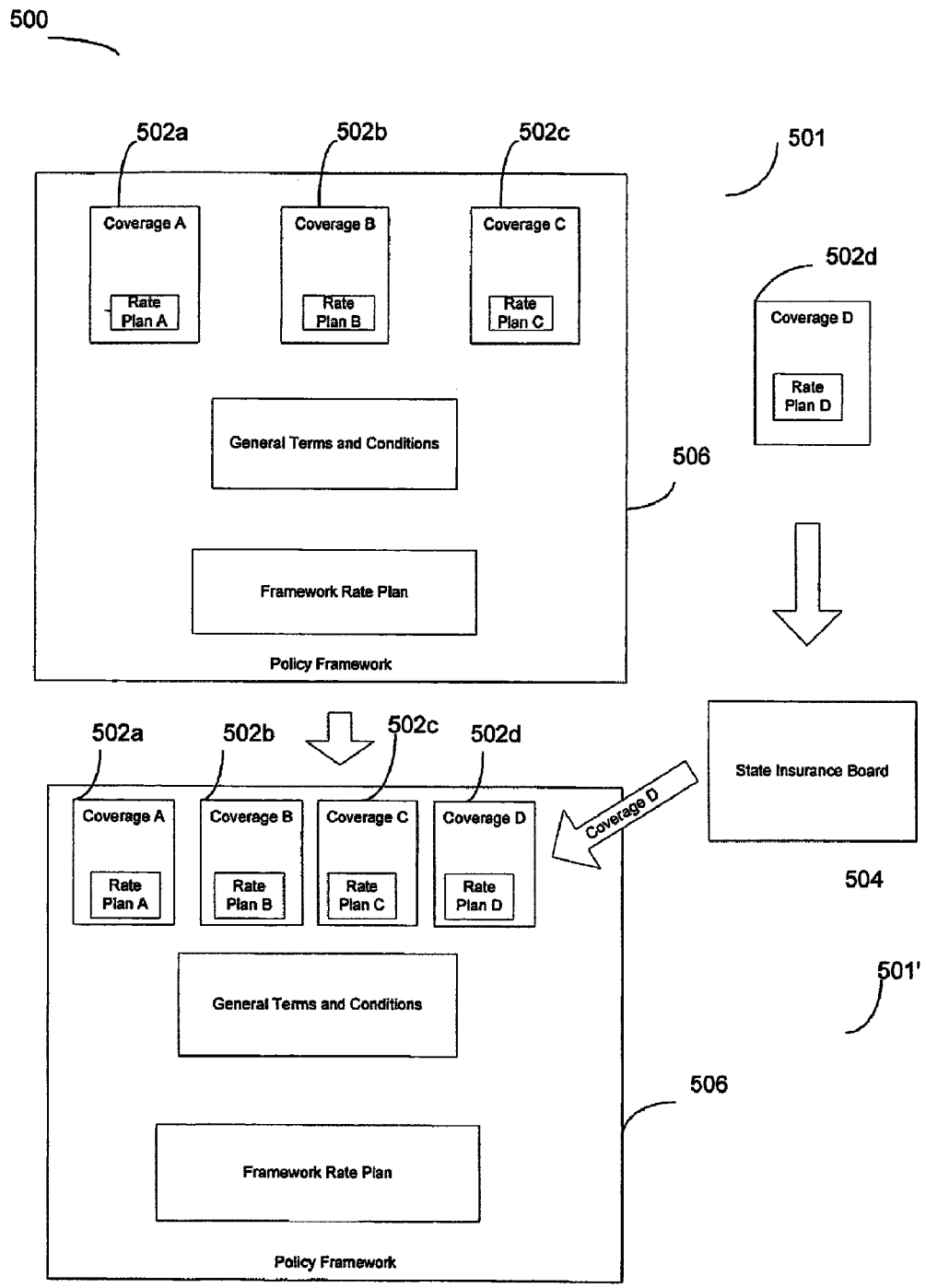
FIG. 5 is a conceptual diagram of a method for obtaining regulatory approval for adding an additional coverage to a set of coverages offered as part of the modular multi-coverage insurance product of FIG. 2, according to an illustrative embodiment of the invention.

FIG. 5 is a conceptual diagram of a method 500 for obtaining regulatory approval for the addition of a new coverage 502d to a MMCIP 501. To obtain regulatory approval, the insurance company files the new coverage 502d with the state regulatory board 504 for independent approval. If the state regulatory board 504 approves the new coverage 502d, and the policy framework 506 of the MMCIP 501 contemplates including such a coverage, the insurance company can begin offering MMCIP 501', including the previously approved coverages 502a-502c and the newly approved coverage 502d.

The fact that MMCIP coverages, such as coverages 302, 402, and 502, can be independently approved, modified, and added to an MMCIP make them modular in nature. An insurance company can update a MMCIP with less risk and with greater ease then they could with multi-coverage insurance policies that were based on non-modular coverages.

Figure 6:
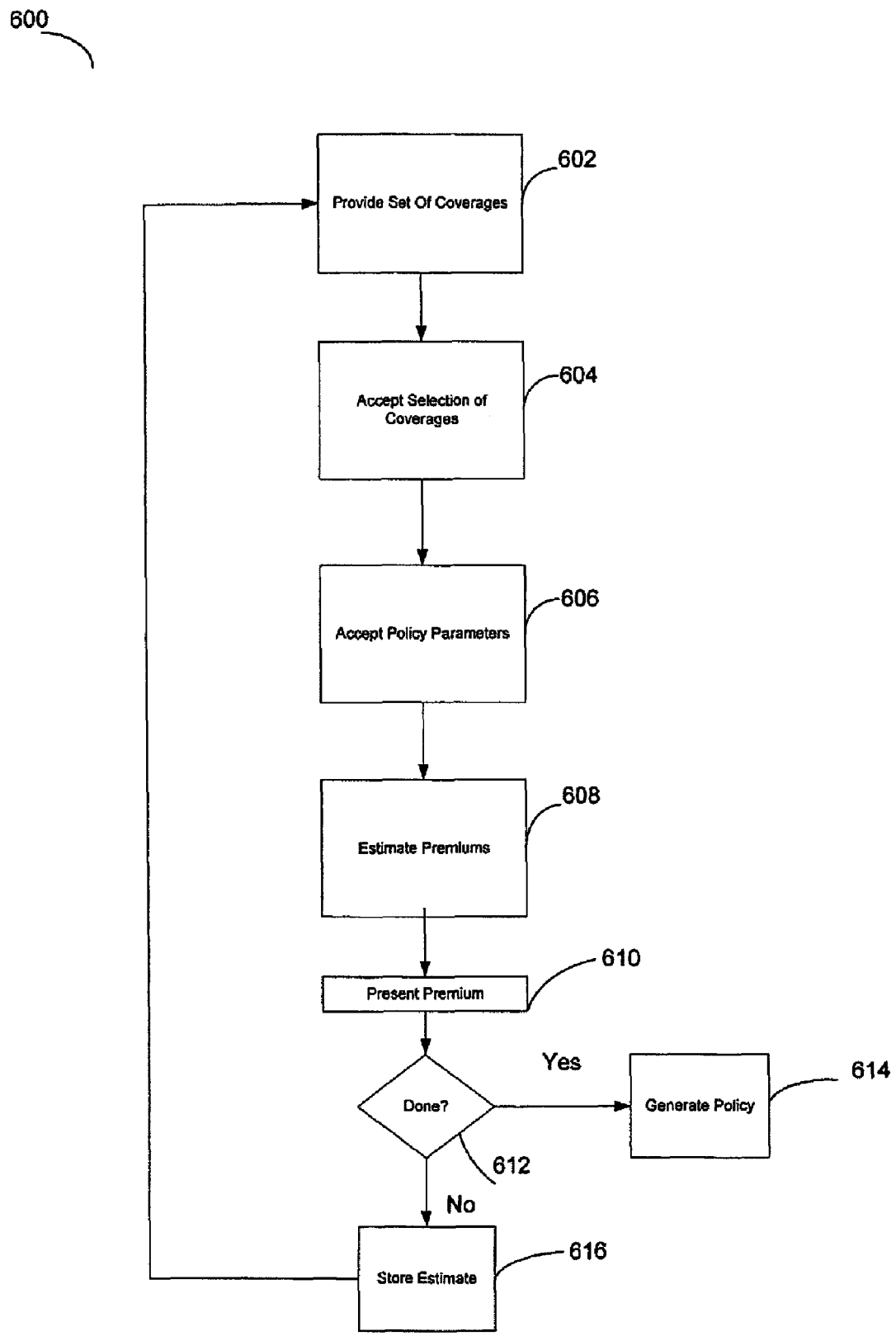
FIG. 6 is a flowchart of a method for generating a multi-coverage insurance policy, based on the modular multi-coverage insurance product of FIG. 2, according to an illustrative embodiment of the invention.

FIG. 6 is a flowchart of a method 600 of generating a modular multi-coverage insurance policy according to an illustrative embodiment of the invention. The method begins with providing a set of pre-approved modular insurance coverages, such as coverages 202, 302, 402, or 502, to a user (step 602). The user can be a customer seeking insurance from an insurance company, or the user can be an insurance agent or broker offering insurance policies based on an MMCIP, such as MMCIPs 200, 301, 401, or 501. Depending on the policy desired by the user, the user selects one or more of the pre-approved modular insurance coverages. The selected coverages are accepted at step 604. The method 600 includes accepting additional policy parameters from the user (step 606). For example, the user may input coverage liability limits and deductibles. The user may request separate liability limits and deductibles for each selected coverage, or the user may request shared liability limits across coverages.

Based on the accepted coverage selections and the policy parameters, the method 600 includes estimating a premium (step 608) for a policy having the characteristics requested by the user. The estimated premium also takes into account underwriting information known about the policy buyer, if available. The premium is presented to the user at step 610. If the user is satisfied with the estimate at decision block 612, the method 600 includes generating an insurance policy (step 614) including the selected coverages and the accepted parameters. The policy is generated by combining the accepted coverages, their corresponding parameters, and the policy framework into an insurance policy. The resulting insurance policy can be purchased and executed electronically, using for example, a digital signature. Alternatively, a user can print corresponding documentation for manual execution.

If the user wants to view additional options at decision block 612, the method 600 includes storing the premium estimate with its corresponding parameters (step 616), and beginning the estimation process again at step 602. Subsequently, the user can retrieve, review, compare, and select any of prior estimates generated by the method 600. The user can continue generating estimates until the user is satisfied with a resulting estimate.

Figure 7:
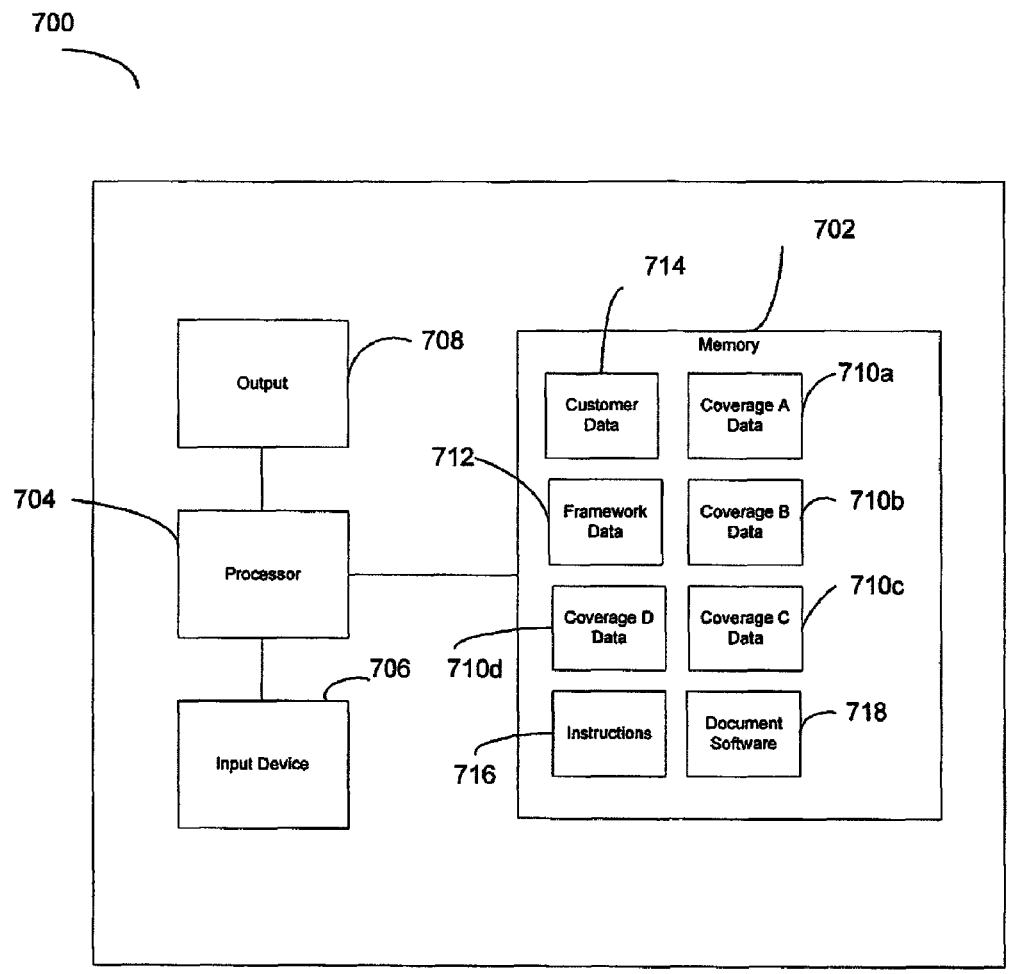
FIG. 7 is a block diagram of a standalone modular multi-coverage insurance product policy generation system, according to an illustrative embodiment of the invention.

FIG. 7 is a block diagram of a standalone implementation of a MMCIP policy generation system 700 on which the method for generating a multi-coverage insurance policy can be implemented, according to an illustrative embodiment of the invention. The MMCIP policy generation system 700 includes a memory 702, a processor 704, an input device 706 and an output 708, co-located on a single computing device.

The memory 702 includes data corresponding to each of the modular coverages being offered in the MMCIP. For example, memory 702 includes data corresponding to Coverage A 710*a*, Coverage B 710*b*, Coverage C 710*c*, and Coverage D 710*d*. Such data includes a rating plan, acceptable liability limits, riders, exemptions, a description of the coverage, and corresponding forms. The memory 702 also includes policy framework data 712. The policy framework data 712 includes a rating plan, forms, riders, exemptions, and general terms and conditions. The memory 702 also may store customer data 714, including biographical information, underwriting data, and stored premium estimates.

The memory 702 may also include instructions 716 in the form of computer software (either source code or object code) for implementing the method 600 described above. For example, the memory 702 may include database software for managing the coverage data 710*a*-710*d* and customer data 714, and for calculating premium estimates based on the stored data. The memory 702 may also optionally include document generation and manipulation software 718 for combining the forms corresponding to the coverages and to the policy framework, thereby generating a complete insurance policy.

The processor 704 can be a general or special purpose processor, programmable ROM device, application specific processor, a digital signal processor, or a combination thereof. Referring to FIGS. 6, and 7, the input device 706 accepts input from a user to be used in generating premium estimates and insurance policies (see steps 604 and 612). For example, the input device may be a keyboard, mouse, trackball, touch screen, microphone, or any other form of input device known to those skilled in the art for accepting data into a computing device. The output device 708 presents to a system user the plurality of coverages from which the user can select (see step 602) and the premium estimates generated by the MMCIP policy generation system 700 (see step 610). In one implementation, the output device can be a display screen, a speaker, or any other device known by those skilled in the art for presenting information to a computer user. In an additional implementation, the MMCIP policy generation system 700 may also include a printer as an output device 708 for printing out forms for generated policies.

Figure 8:
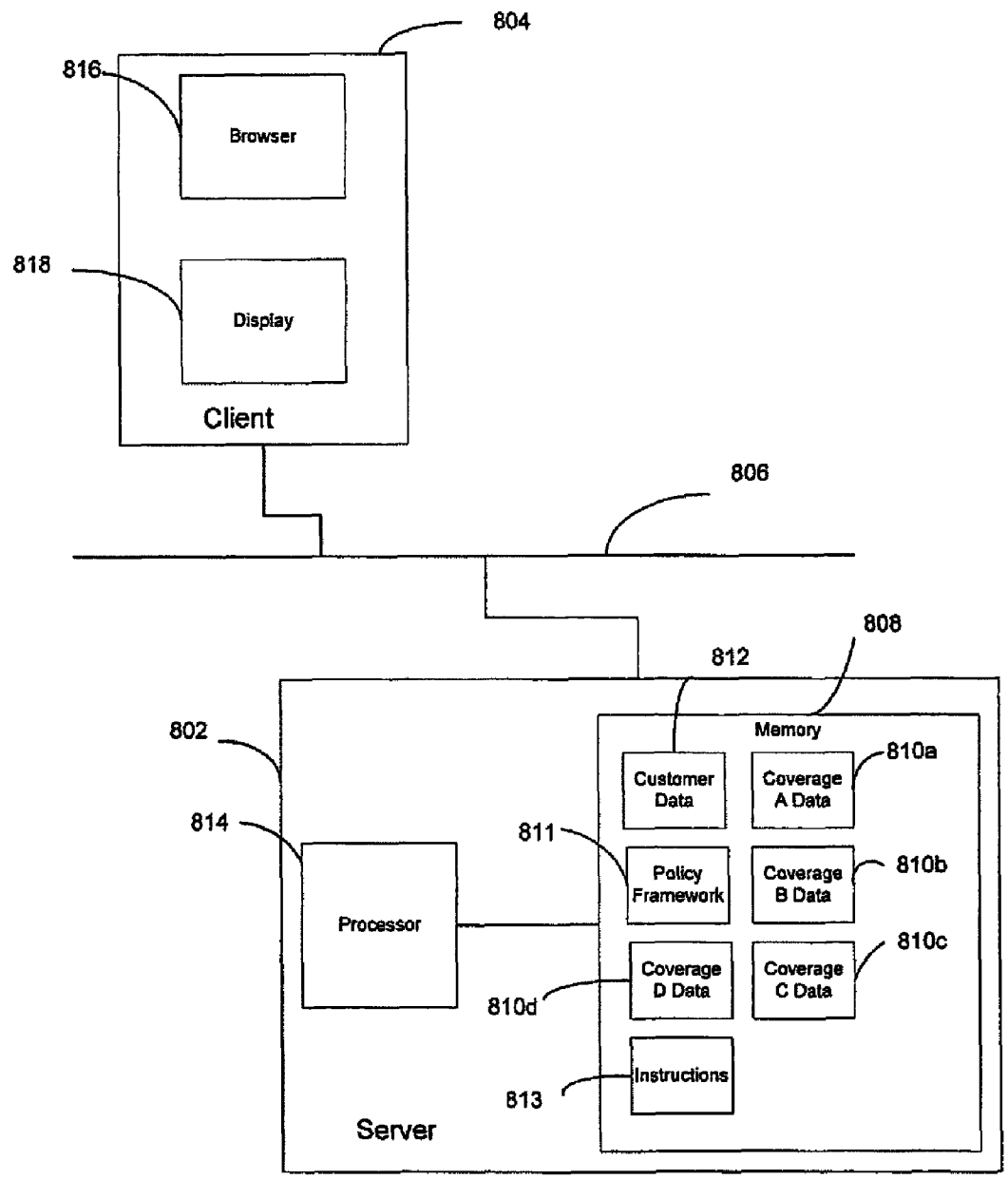
FIG. 8 is conceptual diagram of a client-server based system for generating a multi-coverage insurance policy, based on the modular multi-coverage insurance product of FIG. 2, according to an illustrative embodiment of the invention.

FIG. 8 is a block diagram of a client-server implementation of an MMCIP policy generation system 800 (the "client-server system 800"), according to an illustrative embodiment of the invention. The client-server system 800 can be accessed by a potential customer conducting research on insurance policies. The client server system 800 may also be used by a remotely located insurance agent, underwriter or broker. The client-server system 800 includes at least one server 802 and one or more client computing devices, such as client computing device 804. The server 802 and the client computing device 804 communicate via a network 806, such as a local area or wide area network. In one particular example, the server 802 and the client computing device communicate over the Internet using HTTP or a similar protocol. Such communications may be secured, for example, using a secure socket layer protocol or other encryption scheme known in the art.

The server 802 includes a server memory 808 storing the data corresponding to the various coverages 810*a*-810*d* offered as part of the MMCIP, the policy framework 811, customer information 812, and instructions 813 for carrying out the MMCIP policy generation method 600 in the form of one or more software programs or scripts. For example, the server 802 may include web hosting software providing a means for serving web pages which include a listing of the available coverages to users. The web hosting software also provides a means for the server 802 to accept user selections of coverages and additional policy parameters, through, for example, a common gateway interface. For example, in one implementation the web pages are form driven or otherwise interactive. Users, at the client computing device 804, can input coverage selections and policy parameters into the web page form and then submit the form back to the server 802. The server 802 includes a processor 814 for executing the instructions 813 stored in memory 808. The server 802 may utilize alternative means for providing users with a list of available coverages and for receiving user input. For example, the server 802 might operate custom software including remote access functionality. In such implementations, the client computing device 804 operates a front end application designed to interoperate with a database application executing on the server 802.

The client computing device 804 can be a desktop computer, a laptop, a handheld computer, or other computing device having sufficient computing and user interface components to interact with the server 802. The client computing device 804 includes a means for accessing data and services provided by the server 802. In one implementation, the access means includes a browser application 816, such as Internet Explorer™, provided by Microsoft Corporation of Redmond, Wash. A client computing device 804 user utilizes the browser application 816 to log into a web site provided by the insurance company, hosted, for example, on the server 802. Alternatively the access means includes a dedicated application designed for accessing and interacting with the server 802. For example, the dedicated application may be a customized front end for interacting with a database stored on the server 802. The client computing device 804 also includes means for displaying the list of available coverages to a user, such as a monitor 818, a LCD display, a projector, or a printer.

FIGS. 9-14 are computer screen shots output by an MMCIP software application, embodied, for example, in the instructions 716 or 813 depicted in FIGS. 7 and 8, for generating insurance policies and quotes for such insurance policies for an MMCIP (such as MMCIPs 200, 301, 401, and 501), according to an illustrative embodiment of the invention. The illustrative software application is preferably utilized by insurance agents or brokers, though it could be adapted for direct end-customer use without departing from the scope of the invention. While the following description refers to various "screens," such screens may also be implemented as display windows. In such implementations, the software application may display multiple "screens" concurrently.

Figure 9:
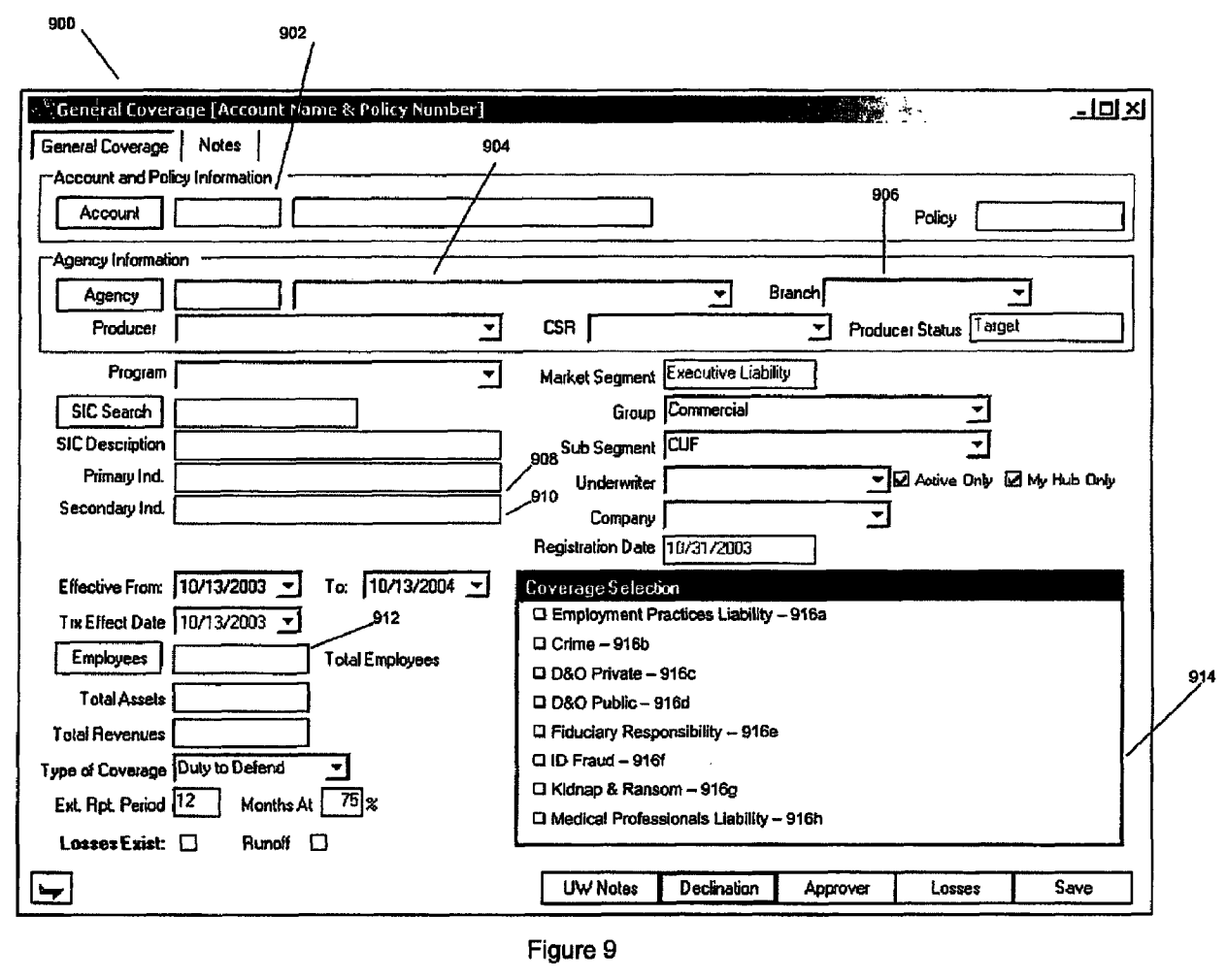

In particular, FIG. 9 is a screen shot of a general information input screen 900 ("general information screen 900"). The general information screen 900 includes a number of data fields related to general customer and insurance policy information. The fields include, for example, and without limitation, an account identifier 902 corresponding to the customer, the name of the insurance agency 904 offering the policy, a branch identifier 906 corresponding to the individual branch of the insurance agency offering the insurance policy, identifiers 908 and 910 indicating the industries in which the company operates, and the number of employees the company employs 912. In addition, the general information input screen 900 includes a coverage selection window 914. The coverage selection window 914 includes a list of modular insurance coverages 916a-916h (generally "coverages 916"), which the insurance agent can combine to form an insurance policy. The agent can select one or more coverages 916, for example, by activating a checkbox located beside each desired coverage 916 with a mouse or other user interface device.

Figure 10:
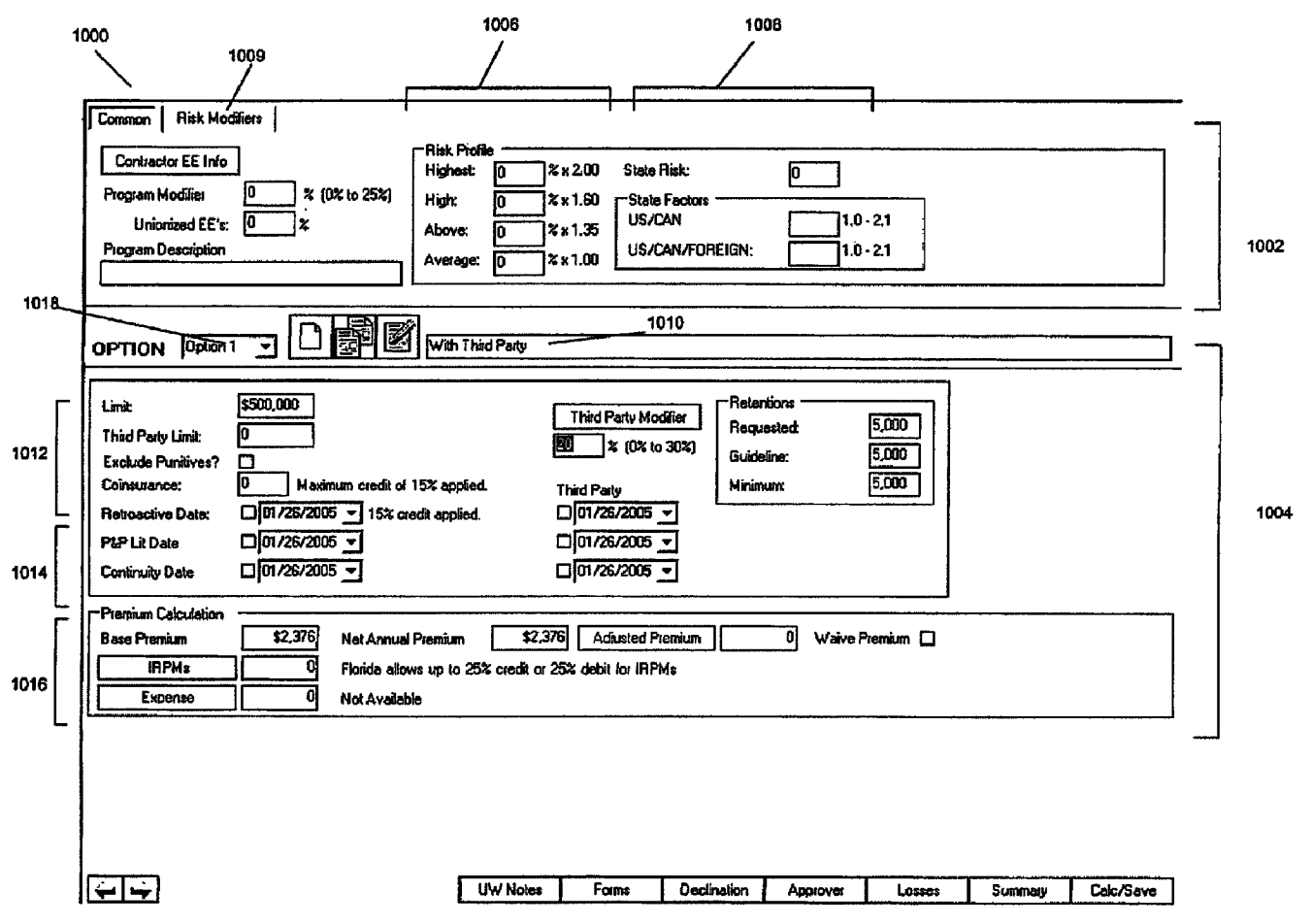
Figure 11:
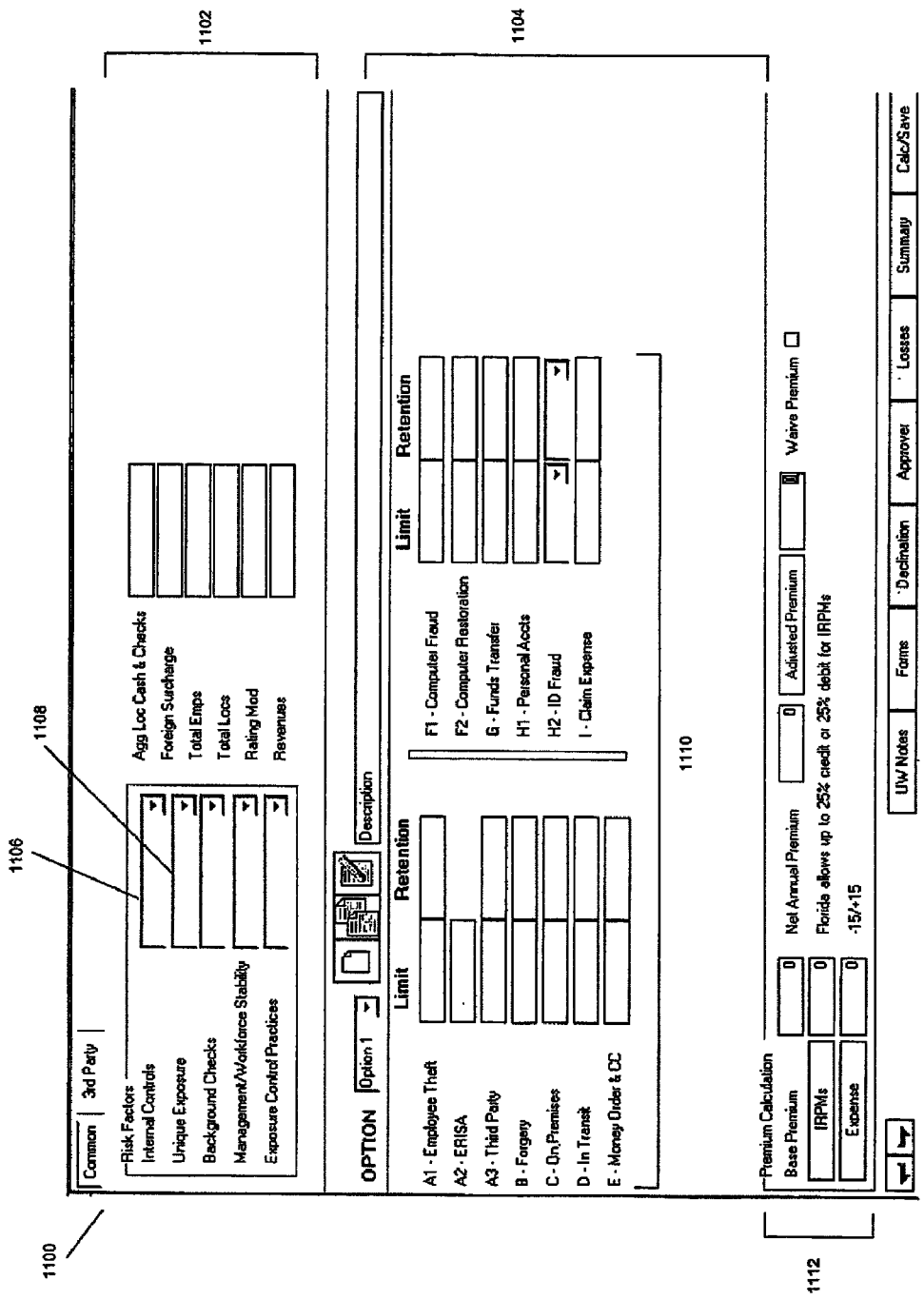

The software application provides various screens for entering data and generating premium quotes corresponding to each of the coverages 916. Two of such screens are depicted in FIGS. 10 and 11 corresponding to an employment practices liability ("EPL") coverage, coverage 916a, and a crime coverage, coverage 916b, respectively. The selection of these two coverages 916a and 916b are merely for illustrative purposes. The software product includes similar screens related to each available coverage 916.

FIG. 10 is a computer screen shot 1000 of an input screen for entering information related to a modular Employment Practices Liability insurance coverage (the "EPL coverage screen 1000"), according to an illustrative embodiment of the insurance. The EPL coverage screen 1000 accepts data related to an Employment Practices Liabilities coverage 916a.

For any coverage 916, an insurance agent using the software application can generate quotes for multiple coverage options. A coverage option includes particular limits, deductibles, attachment points, endorsements, or other terms for a given coverage. For example, a first EPL coverage option may include a $1,000,000 limit with a $10,000 deductible. A second EPL coverage option may include a $5,000,000 limit with a $500,000 deductible.

The EPL coverage screen 1000 is divided into two sections, a general EPL risk data entry section 1002 (the "general EPL risk section 1002") and an EPL option-specific data entry section 1004. The general EPL risk section 1002 accepts data which impacts premium pricing for a customer independent of the specified parameters of a desired coverage option. For example, the general EPL risk section 1002 accepts data corresponding to the risk profile 1006 into which the customer fits (i.e., "highest", "high", "Above", and "Average"). Similarly, the general EPL risk section 1002 also accepts state risk modifiers 1008 based on the state or territory in which the customer operates. Additional information that would affect all EPL coverage options can be entered in a data entry section available by selecting the risk modifiers tab 1009, located towards the top of the EPL coverage screen 1000.

The EPL option-specific section 1004 (the "EPL option section 1004") accepts data that defines a particular option. For example, the EPL option section 1004 includes an option description data entry field 1010, coverage limit data entry fields 1012, and several effective date data entry fields 1014. The option description data entry field 1010 allows an insurance agent to attach a label to a particular option so that it can be identified later when comparing multiple coverage options. For example, the option description data entry field 1010 in the illustrative EPL coverage screen 1000 reads "with Third Party," indicating to the insurance agent that the illustrated coverage option includes third party coverage. The coverage limit data entry field 1012 allows for the input of a desired coverage limit. The effective data fields 1014 allow entry of one or more dates corresponding to when the desired coverage option would become effective. The EPL option section 1004 includes additional data entry fields suitable for entering additional information that may affect the premium for the requested coverage option. The EPL option section 1004 includes a premium calculation section 1016 which displays a premium calculated based on the data entered into the general EPL risk section 1002 and the EPL option section 1004.

After an insurance agent enters information into the EPL option section 1004 to determine a first premium, the insurance agent can begin pricing out additional coverage options. The EPL coverage screen 1000 includes an option drop down box 1018, by which a user can select a new coverage option to price or to select a previously priced coverage option to review or edit.

FIG. 11 is a computer screen shot 1100 of an input screen for entering information related to crime insurance coverage (the "crime coverage screen 1100"), according to an illustrative embodiment of the insurance. Crime coverage screen 1100 corresponds to a crime coverage 916b. As with EPL coverage screen 1000, the crime coverage screen 1100 includes a general data entry section 1102 ("general crime section 1102") and an option-specific data entry section 1104 (crime option section 1104"). Since the crime coverage screen 1100 applies to a different insurance coverage than the EPL coverage screen 1000, the general crime section 1102 includes different general risk modifiers, such as an "internal controls" drop down box 1106 and a "Unique Exposure" drop down box 1108, than the general EPL section 1002. For similar reasons, the crime option section 1104 includes different data fields than the EPL option section 1004. For example, the crime option section 1104 includes coverage data fields 1110 for a plurality of limits corresponding to various crimes for which coverage is sought. As with the EPL coverage screen 1000, the crime option section includes a premium calculation section 1112.

Figure 12:
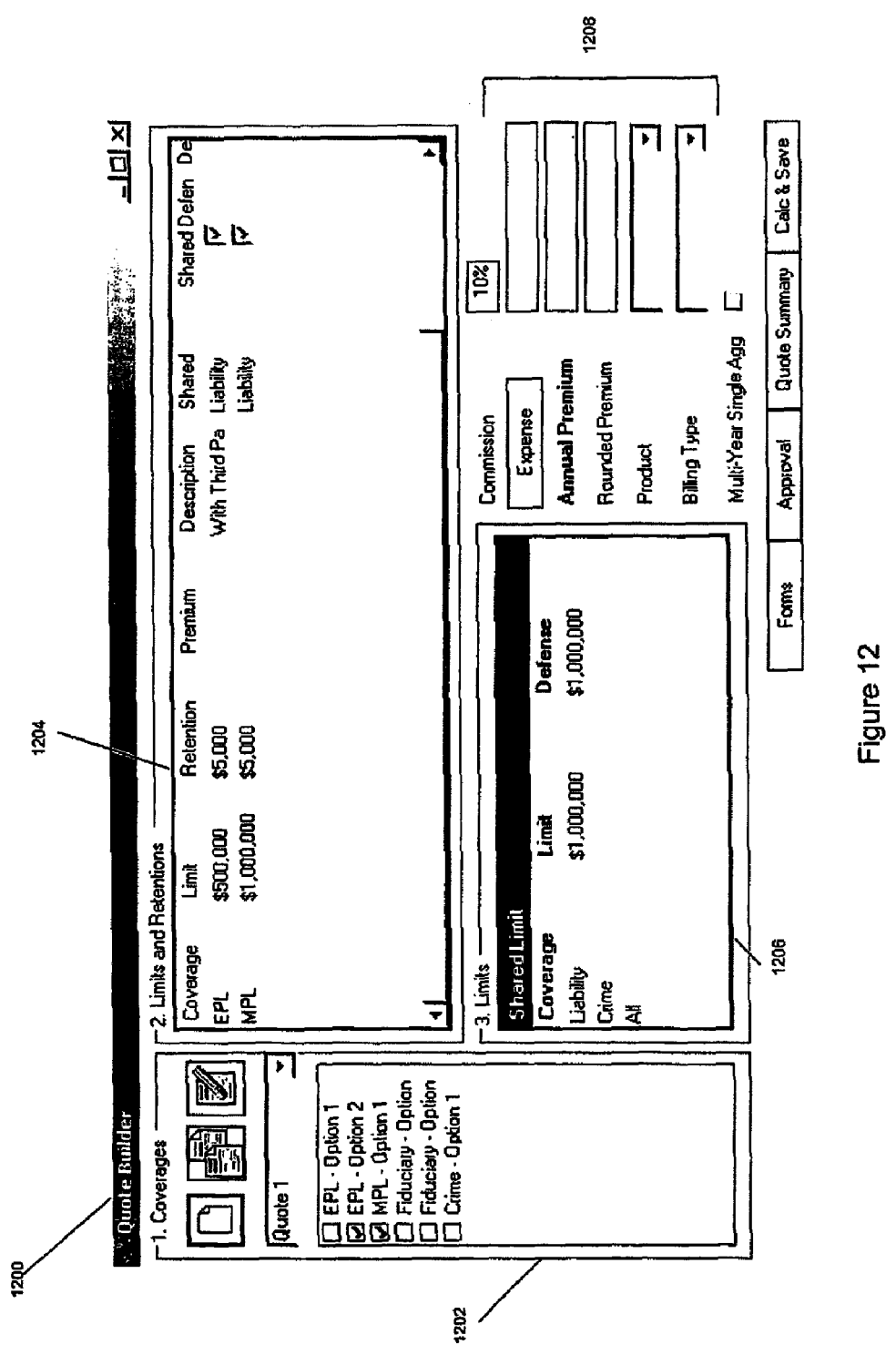

FIG. 12 is a computer screen shot 1200 incorporating a quote building function (the "quote building screen 1200") according to the illustrative embodiment of the invention. Among other features, the quote building screen shot 1200 includes four primary sections, a coverage option selection section 1202, a limit and retention display section 1204, a shared limit section 1206, and premium calculation section 1208. The coverage option selection section 1202 displays a list of all coverage options previous configured by the insurance agent, using for example, the EPL coverage screen shot 1000 or the crime coverage screen shot 1100. The illustrative coverage option selection section 1202 lists two EPL coverage options, a medical professionals liability ("MPL") coverage option, two fiduciary responsibility coverage options, and a crime coverage option. The insurance agent can generate a quote for a modular multi-coverage insurance policy for the customer by selecting a plurality of the listed coverage options. For example, in the illustrative quote building screen 1200, an insurance agent has selected EPL-Option 2 and MPL-Option 1 from which to generate a policy quote.

The limit and retention display section 1204 displays the limits and retentions selected by the insurance agent for each coverage option selected from the coverage option selection section 1202. The limit and retention display section 1204 also includes a description, if any, input by the insurance agent to label the coverage option. The limit and retention display section 1204 indicates whether the displayed limits are shared among multiple coverages. For coverages that share a limit, the aggregate recoverable losses of the customer cannot exceed the shared limit in a given year. Limits can be shared both for claim losses and for litigation defense costs. The shared limit section 1206 allows a user to set specific shared limits for multiple coverages. For example, the shared limit section 1206 indicates that the selected coverage options from the coverage selection section 1202 share a $1,000,000 liability limit and a $1,000,000 defense limit.

The premium calculation section 1208 displays a calculated premium for the combined set of coverage options selected by the insurance agent. The combined premium is based on the premiums calculated for each individual coverage option and a rating plan for the MMCIP. After generating a quote for a premium for a given selection of coverage options with a given set of limits, the agent can save the quote and begin quoting a different set of selected coverage options.

FIG. 13 is a computer screen shot of a quote summary screen 1300 which presents a summary of all quotes Q1, Q2, and Q3 prepared using the quote building screen 1200. The inclusion of three quotes Q1, Q2, and Q3 is merely illustrative. The quote summary screen 1300 can display summary information related fewer quotes or more quotes depending upon how many quotes have been generated. The quote summary screen 1300 includes, among other features, a policy summary section 1302, an endorsement summary section 1304, a coverage summary section 1306, and a policy selection section 1308. In general, the summary sections 1302, 1304, and 1306 are laid out in a table format. Policy parameters are listed in the left-hand column of the corresponding tables and specifics for each parameter for each quoted policy Q1, Q2, and Q3 are located in columns to the right.

The policy summary section 1302 includes top-level data for each generated quote Q1, Q2, and Q3. For example, and without limitation, the policy summary section 1302 includes a total premium, a shared liability limit, and a shared defense limit for each policy Q1, Q2, and Q3. The endorsements section 1304 identifies which, if any, endorsements have been included in each quoted policy Q1, Q2, and Q3. The coverage section 1306 displays information particular to each coverage option included in each quote Q1, Q2, and Q3, such as the base premium for the coverage option and the specific limits of the coverage options. If an insurance agent wants to issue a quoted policy, the insurance agent can select the quoted policy in the policy selection section 1308 and then select a Bill and Issue button 1310 on the quote summary screen 1300 to issue the policy.

Figure 14:
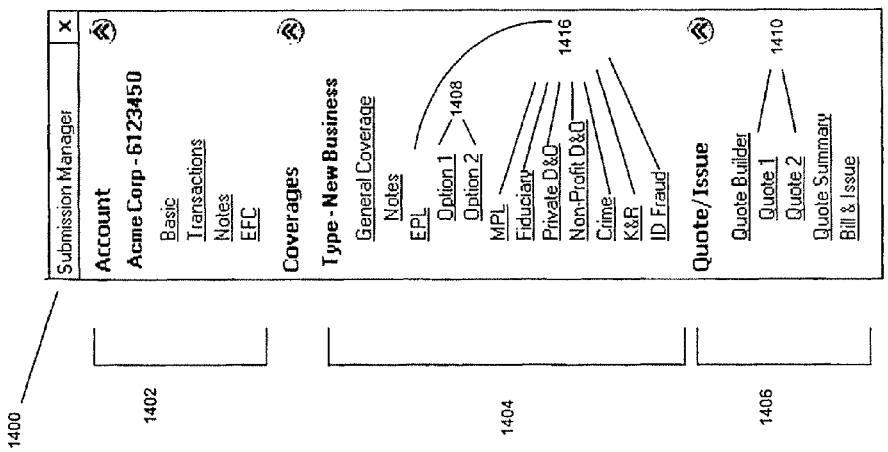

FIG. 14 corresponds to a submission manager window 1400 employed by the software application to aid in navigating through the policy quoting and generation process. The submission manager window 1400 includes three sets of links, general information links 1402, coverage links 1404, and quote building links 1406. Selecting one of the general information links 1404 results in the display of a data entry screen for inputting general information about a customer or policy. Selection of one of the coverage links 1404 results in the display of a data input screen, such as the EPL coverage screen 1000 or the crime coverage screen 1100, corresponding to the given coverage. In one implementation, the links included in the coverage links 1404 are dynamically updated to only include the coverages 916 selected by the insurance agent in the coverage selection window 914 of the general information screen 900 and coverage options 1408 generated using the data input screens. The quote building links 1406 are linked to the quote building screen 1200, quotes 1410 generated using the quote building screen 1200, the quote summary screen 1300, and a bill and issue function 1412 allowing the agent to directly issue a policy.

Figure 15:
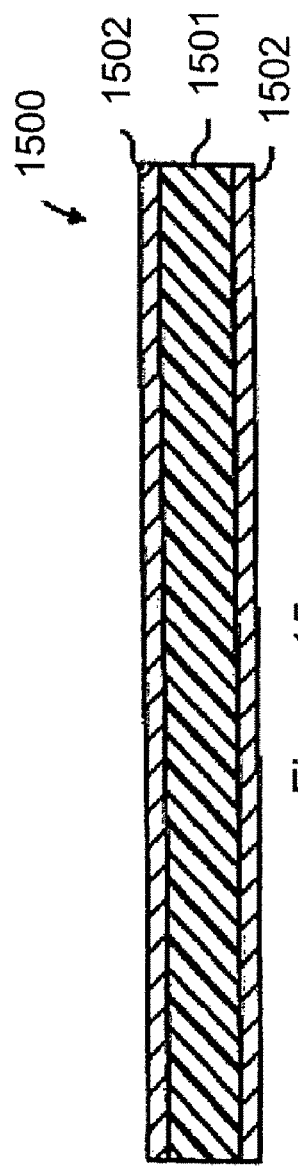
FIG. 15 is a cross-sectional view of a magnetic data storage medium encoded with a set of machine-executable instructions for performing a method for generating insurance policies and quotes for such insurance policies based on the modular multi-coverage insurance product of FIG. 2, an according to an illustrative embodiment of the invention.

FIG. 15 shows a cross section of a magnetic data storage medium 1500 which can be encoded with a machine-executable program that can be carried out by a system such as systems 700 and 800 of FIGS. 7 and 8. Medium 1500 can be a conventional floppy diskette or hard disk, having a suitable substrate 1501, which may be conventional, and a suitable coating 1502, which may be conventional, on one or both sides, containing magnetic domains (not visible) whose polarity or orientation can be altered magnetically. Medium 1500 may also have an opening (not shown) for receiving the spindle of a disk drive or other data storage device.

The magnetic domains of coating 1502 of medium 1500 are polarized or oriented so as to encode, in a mariner which may be conventional, a machine-executable program such as that described above in connection with FIGS. 9-14, for execution by a system such as systems 700 or of FIGS. 7 and 8.

Figure 16:
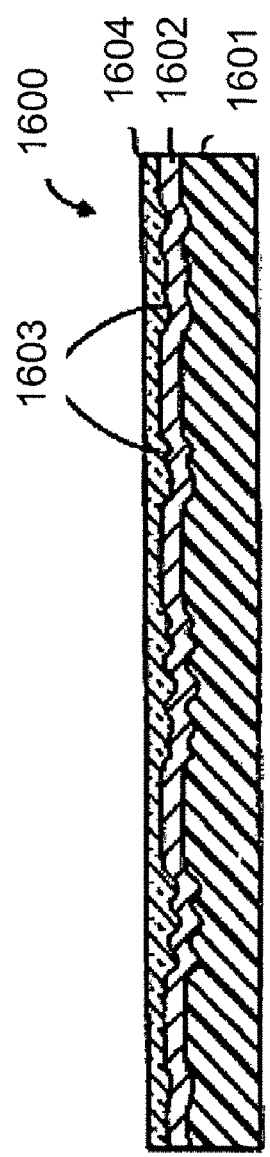
FIG. 16 is a cross-sectional view of an optically readable data storage medium encoded with a set of machine-executable instructions for performing a method for generating insurance policies and quotes for such insurance policies based on the modular multi-coverage insurance product of FIG. 2, an according to an illustrative embodiment of the invention.

FIG. 16 shows a cross section of an optically-readable data storage medium 1600 which also can be encoded with such a machine-executable program, which can be carried out by a system such as systems 700 or of FIGS. 7 and 8. Medium 1600 can be a conventional compact disk read only memory ("CD-ROM") or a rewritable medium such as a magneto-optical disk which is optically readable and magneto-optically writable. Medium 1600 preferably has a suitable substrate 1601, which may be conventional, and a suitable coating 1602, which may be conventional, usually on one side of substrate 1601.

In the case of a CD-ROM, as is well known, coating 1602 is reflective and is impressed with a plurality of pits 1603 to encode the machine-executable program. The arrangement of pits is read by reflecting laser light off the surface of coating 1602. A protective coating 1604, which preferably is substantially transparent, is provided on top of coating 1602.

In the case of a magneto-optical disk, as is well known, coating 1602 has no pits 1603, but has a plurality of magnetic domains whose polarity or orientation can be changed magnetically when heated above a certain temperature, as by a laser (not shown). The orientation of the domains can be read by measuring the polarization of laser light reflected from coating 1602. The arrangement of the domains encodes the program as described above.

The invention may be embodied in other specific forms without departing from the spirit or essential characteristics thereof. The forgoing embodiments are therefore to be considered in all respects illustrative, rather than limiting of the invention.

The invention claimed is:

1. A computer-implemented method, comprising:
    causing the display by the computer, for selection by a user, of at least one of a plurality of modular insurance coverages previously approved by at least one state, wherein each of the at least one of the plurality of modular insurance coverages has a corresponding modular rating plan, and at least one of the plurality of modular insurance coverages comprises a standalone insurance policy;
    combining by the computer the at least one of the plurality of modular insurance coverages selected by the user with a policy framework previously approved by the at least one state, wherein the policy framework has a corresponding framework rating plan independently previously approved by the at least one state;
    generating by the computer at least one insurance policy for the at least one of the plurality of modular insurance coverages, said policy not requiring further approval from the at least one state; and
    determining by the computer a premium for the insurance policy using the at least one of the plurality of modular insurance coverages selected by the user and the framework rating plan.

2. The method of claim 1, wherein the set of modular coverages includes at least one of property and casualty coverage, a private company directors and officers liability coverage, a nonprofit organization directors and officers liability coverage, an employment practices liability coverage, a fiduciary liability coverage, a miscellaneous professional liability coverage, a crime coverage, a kidnap and ransom coverage, and an identity fraud coverage.

3. The method of claim 1, wherein the policy framework comprises terms and conditions to be applied to the subset of selected coverages.

4. The method of claim 1, wherein said combining further comprises combining the plurality of each of the modular coverages of the set of independent and previously approved modular coverages, and generating a plurality of distinct policies responsive to said combining.

5. The method of claim 1, wherein said combining further comprises combining the plurality of each of the modular coverages of the set of independent and previously approved modular coverages, and generating a plurality of distinct policies with distinct premiums responsive to said combining.

6. The method of claim 1, wherein said determining further comprises determining the insurance policy pricing based on selection of one or more coverage options by the user.

7. The method of claim 6, wherein the coverage options include at least one of coverage limits, deductibles, retentions, and endorsements, for the generated insurance policy.

8. The method of claim 1,
wherein said generating further comprises generating the at least one insurance policy from the plurality of modular policies in accordance with the user's selected coverages and policy parameters, and
further comprising presenting by the computer the combined selected subset of modular coverages and the insurance policy pricing to the user as a single insurance policy.

9. The method of claim 1, further comprising presenting by the computer the combined selected subset of modular coverages and the insurance policy pricing as a single insurance policy with a single quote letter and bill to the user in response to generating the insurance policy.

10. The method of claim 1, further comprising automatically updating by the computer the terms of the generated insurance policy based on the combined selected subset of modular coverages, the policy framework, and the framework rating plan.

11. The method of claim 1, further comprising receiving by the computer the selection from the user of the subset of the plurality of the modular coverages, and determining the insurance policy pricing based on at least one of separate and shared liability limits, retentions, and deductibles across the selected subset of the modular coverages.

12. The method of claim 1,
wherein said receiving further comprises receiving a selection of a single pre-approved modular insurance coverage from the user and further receiving from the user policy parameters related to the selected pre-approved modular insurance coverages, including at least one coverage liability limit amount and at least one deductible amount;
wherein said generating further comprises generating the at least one insurance policy from the single modular policy and in accordance with the user's selected coverages and policy parameters, and
further comprising presenting by the computer the single modular coverage and the insurance policy pricing as a single insurance policy with a single quote letter and bill to the user in response to generating the insurance policy.

13. The method of claim 1,
wherein the user comprises at least one of insurance agent, insurance broker, a direct insurance end-user, an underwriter, and an insurance company employee, and
further comprising generating by the computer a plurality of insurance policy pricing estimates responsive to a request from the user.

14. The method of claim 1, further comprising generating by the computer a plurality of pricing estimates for multiple coverage options including a plurality of at least one of limits, deductibles, retentions, attachment points, endorsements, and other terms for a predetermined coverage.

15. The method of claim 1,
wherein the user comprises at least one of insurance agent, insurance broker, a direct insurance end-user, an underwriter, and an insurance company employee, and
further comprising generating by the computer a plurality of pricing estimates responsive to a request from the customer selecting different coverage options.

16. The method of claim 1,
wherein the user comprises at least one of insurance agent, insurance broker, a direct insurance end-user, an underwriter, and an insurance company employee, and
further comprising generating by the computer a plurality of insurance policy pricing estimates responsive to a request from the user selecting different coverage options including the limits and retentions selected by the user for each coverage option and whether the limits are shared among multiple coverages.

17. The method of claim 1, further comprising modifying by the computer at least one of the subset of the modular coverages selected by the user and the premium, based on the policy framework and the framework rating plan, with respect to the plurality of modular coverages without having to subject each of the modular coverages in the modified subset to another rating process when the policy framework indicates that a modification is to be performed to the subset of the modular coverages.

18. The method of claim 1, wherein the user comprises at least one of insurance agent, insurance broker, a direct insurance end-user, an underwriter, and an insurance company employee.

19. A computer system, comprising:
a insurance processing computer system in communication with an electronic network and at least one database, wherein the insurance processing computer system is configured to:
cause the display, by the insurance processing computer system, for selection by the user, of at least one of a plurality of modular insurance coverages previously approved by at least one state, wherein each of the at least one of the plurality of modular insurance coverages has a corresponding modular rating plan, and at least one of the plurality of modular insurance coverages comprises a standalone insurance policy;
combine by the insurance processing computer system the at least one of the plurality of modular insurance coverages selected by the user with a policy framework previously approved by the at least one state, wherein the policy framework has a corresponding framework rating plan independently previously approved by the at least one state;
generate by the insurance processing computer system at least one insurance policy for the at least one of the plurality of modular insurance coverages, said policy not requiring further approval from the at least one state; and determine by the insurance processing computer system a premium for the insurance policy using the at least one of the plurality of modular insurance coverages selected by the user and the framework rating plan.

20. The insurance processing computer system of claim 19, wherein the set of modular coverages includes at least one of property and casualty coverage, a private company directors and officers liability coverage, a nonprofit organization directors and officers liability coverage, an employment practices liability coverage, a fiduciary liability coverage, a miscellaneous professional liability coverage, a crime coverage, a kidnap and ransom coverage, and an identity fraud coverage.

21. The insurance processing computer system of claim 19, wherein said combining further comprises combining the plurality of each of the modular coverages of the set of independent and previously approved modular coverages, and generating a plurality of distinct policies with distinct premiums responsive to said combining.

22. The insurance processing computer system of claim 19, wherein said determining further comprises determining the insurance policy pricing based on selection of one or more coverage options by the user.

23. The insurance processing computer system of claim 19, wherein said generating further comprises generating the at least one insurance policy from the plurality of modular policies in accordance with the user's selected coverages and policy parameters, and
wherein the insurance processing computer system is further configured to present the combined selected subset of modular coverages and the insurance policy pricing to the user as a single insurance policy.

24. The insurance processing computer system of claim 19, wherein the insurance processing computer system is further configured to present the combined selected subset of modular coverages and the insurance policy pricing as a single insurance policy with a single quote letter and bill to the user in response to generating the insurance policy.

25. The insurance processing computer system of claim 19, wherein the insurance processing computer system is further configured to automatically update the terms of the generated insurance policy based on the combined selected subset of modular coverages, the policy framework, and the framework rating plan.

26. The insurance processing computer system of claim 19, wherein the insurance processing computer system is further configured to receive the selection from the user of the subset of the plurality of the modular coverages, and determining the insurance policy pricing based on at least one of separate and shared liability limits, retentions, and deductibles across the selected subset of the modular coverages.

27. The insurance processing computer system of claim 19,
wherein said receiving further comprises receiving a selection of a single pre-approved modular insurance coverage from the user and further receiving from the user policy parameters related to the selected pre-approved modular insurance coverages, including at least one coverage liability limit amount and at least one deductible amount;
wherein said generating further comprises generating the at least one insurance policy from the single modular policy and in accordance with the user's selected coverages and policy parameters, and
wherein the insurance processing computer system is further configured to present the single modular coverage and the insurance policy pricing as a single insurance policy with a single quote letter and bill to the user in response to generating the insurance policy.

28. The insurance processing computer system of claim 19,
wherein the user comprises at least one of insurance agent, insurance broker, a direct insurance end-user, and underwriter, and an insurance company employee, and
wherein the insurance processing computer system is further configured to generate a plurality of insurance policy pricing estimates responsive to a request from the user.

29. The insurance processing computer system of claim 19, wherein the insurance processing computer system is further configured to modify at least one of the subset of the modular coverages selected by the user and the premium, based on the policy framework and the framework rating plan, with respect to the plurality of modular coverages without having to subject each of the modular coverages in the modified subset to another rating process when the policy framework indicates that a modification is to be performed to the subset of the modular coverages.

30. The insurance processing computer system of claim 19, wherein the user comprises at least one of insurance agent, insurance broker, a direct insurance end-user, and underwriter, and an insurance company employee.

31. The method of claim 19, wherein generating at least one insurance policy comprises generating a plurality of insurance policies for the at least one of the plurality of modular insurance coverages.

* * * * *